United States Patent [19]
Bhat

[11] Patent Number: 5,985,778
[45] Date of Patent: *Nov. 16, 1999

[54] METHOD AND COMPOSITIONS FOR STABILIZATION OF HEAVY METALS, ACID GAS REMOVAL AND PH CONTROL IN CONTAMINATED MATRICES

[75] Inventor: Vasanth K. Bhat, Cincinnati, Ohio

[73] Assignee: Bhat Industries, Inc., Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/961,823

[22] Filed: Oct. 31, 1997

Related U.S. Application Data

[62] Division of application No. 08/790,700, Jan. 29, 1997, Pat. No. 5,719,099
[60] Provisional application No. 60/028,935, Oct. 22, 1996.

[51] Int. Cl.[6] ........................................ C03C 3/17
[52] U.S. Cl. ................. 501/48; 502/3; 502/414; 502/415; 502/521; 423/242.1
[58] Field of Search ............................ 423/242.1, 157.3; 502/3, 414, 415, 521; 501/48

[56] References Cited

U.S. PATENT DOCUMENTS

| | | |
|---|---|---|
| 4,108,596 | 8/1978 | Hemming et al. . |
| 4,132,558 | 1/1979 | Uchikawa et al. . |
| 4,354,942 | 10/1982 | Kaczur et al. . |
| 4,356,030 | 10/1982 | Halpin et al. . |
| 4,388,283 | 6/1983 | Abrams et al. . |
| 4,465,597 | 8/1984 | Herman et al. . |
| 4,474,595 | 10/1984 | Lawhon, Jr. et al. . |
| 4,515,696 | 5/1985 | Matthew et al. . |
| 4,652,381 | 3/1987 | Inglis . |
| 4,671,882 | 6/1987 | Douglas et al. . |
| 4,737,356 | 4/1988 | O'Hara et al. . |
| 4,764,284 | 8/1988 | Jansen . |
| 4,889,640 | 12/1989 | Stanforth . |
| 4,919,787 | 4/1990 | Chester et al. ............................ 208/52 |
| 4,950,409 | 8/1990 | Stanforth . |
| 5,037,479 | 8/1991 | Stanforth . |
| 5,039,499 | 8/1991 | Stowe, Jr. . |
| 5,087,375 | 2/1992 | Weinwurm . |
| 5,156,746 | 10/1992 | Maree et al. ............................ 210/712 |
| 5,162,600 | 11/1992 | Cody et al. . |
| 5,202,033 | 4/1993 | Stanforth et al. . |
| 5,220,111 | 6/1993 | Bucci et al. . |
| 5,368,741 | 11/1994 | Munday et al. . |
| 5,389,233 | 2/1995 | Senn ........................................ 208/120 |
| 5,397,478 | 3/1995 | Pal et al. ................................. 210/710 |
| 5,422,015 | 6/1995 | Angell et al. . |
| 5,439,658 | 8/1995 | Johnson et al. . |
| 5,491,281 | 2/1996 | Bhat . |
| 5,719,099 | 2/1998 | Bhat ........................................ 502/414 |

FOREIGN PATENT DOCUMENTS 3082052  7/1978  Japan .

OTHER PUBLICATIONS

Etzel, J. E, Industrial Pretreatment TEchnologies for Heavy Metal Removal and Treatment of Heavy Metal Sludge to Render Them Non–Hazardous, Virginia Water Pollution Control Assn., Nov. 3, 1988.

Teringo, III, Magnesium hydroxide reduces sludge/improves filtering, Pollution Engineering, Apr. 1987.

Tallman, D. N. Pahlman, J. E. and Khalafalla, S. F. Reclaiming Heavy Metals from Wastewater Using Magnesium Oxide, U.S. Dept. of Interior, Bureau of Mines, Report of Investigations 9023, 1986.

*Primary Examiner*—John F. Niebling
*Assistant Examiner*—Alexander G. Ghyka
*Attorney, Agent, or Firm*—Oblon, Spivak, McClelland, Maier & Neustadt, P.C

[57] ABSTRACT

A one-step method and compositions for stabilization of heavy metals, acid gas removal and pH control in hazardous and toxic solid, semi-solid, liquid and/or gaseous matrices using a mixture of reactive agents in a single product, for the broader purpose of enhancing environmental pollution control, prevention and remediation are described. The product contains sulfonated calcium aluminum magnesium phosphate. This material may be used alone or in combination with magnesium sulfite and/or hydroboracite.

16 Claims, No Drawings

METHOD AND COMPOSITIONS FOR STABILIZATION OF HEAVY METALS, ACID GAS REMOVAL AND PH CONTROL IN CONTAMINATED MATRICES

This is a divisional of application Ser. No. 08/790,700, filed Jan, 29, 1997, which is now U.S. Pat. No. 5,719,099, based on provisional application filed 60/028,935 on Oct. 22, 1996.

TECHINICAL FIELD

This invention relates to the treatment of contaminated materials. Specifically, it relates to methods and compositions for rendering inert a broad spectrum of heavy metals that may be present in hazardous and/or toxic matrices, such as fly ash and slag from incinerators, process water from ink and paint manufacturing, process dust, water and sludge from ferrous and non-ferrous foundries, electric arc furnace dust, for example, from steel mills, hazardous waste, toxic waste, soils, sludges and sediments. Heavy metals like antimony, arsenic, barium, beryllium, cadmium, chromium, cobalt, copper, lead, mercury, molybdenum, nickel, selenium, silver, thallium, vanadium and zinc are reduced to a level of permanent stability meeting the glacial acetic acid leachate criteria set forth by the U.S. EPA in the Toxicity Characteristic Leaching Procedure (TCLP) and the water leach tests, for example, California or Indiana Water Leach Tests, simulating leaching due to rain as it actually occurs in the environment. The invention also relates to industrial processes that require acid gas removal from the contaminated matrix and pH control of the contaminated matrix.

BACKGROUND OF THE INVENTION

When biologically available, heavy metals leaching from soil, water or waste, as well as those released into the air, are detrimental to all living beings. Permissible levels of heavy metal pollution are regulated by the local, state and federal authorities. The important sets of federal regulations are the Resource Conservation and Recovery Act (RCRA) and the Comprehensive Environmental Response, Compensation, and Liability Act (CERCLA), which governs the Superfund program. One of the earliest remediation methods, the removal and hauling of heavy metal contained waste and soil to a landfill, while still in use, is more frequently being viewed by the public as unacceptable. New regulations and continued desire to find better and/or inexpensive environmental pollution control, prevention and remediation techniques have driven potential hazardous and/or toxic waste generators toward new technologies. Encapsulation of heavy metal-containing waste in portland cement, for example, though meeting the letter of the environmental law, does not meet the spirit of the law when the encapsulated waste is exposed to rain. Under those circumstances, heavy metals go into solution and become biologically available. Permanent stabilization by forming geochemically stable compounds of heavy metals is by far the best solution to this challenge. Certain industrial processes may also release acid gases which need to be removed. Often pH control of the contaminated matrix is also required.

Numerous methods, mostly multi-step and sequential-step, have been utilized to prevent the leaching of hazardous heavy metals in solid, semi-solid, liquid and/or gaseous complex matrices so that the waste is rendered suitable for disposal in a sanitary landfill. There has, however, been no suggestion to use sulfonated calcium aluminum magnesium phosphates, hydroboracite or scrubber magnesium product (magnesium sulfite) for the purpose of providing heavy metal stabilization, together with the additional benefits of acid gas removal and pH control, to contaminated or treated matrices in a one-step method or single-product composition. U.S. Pat. No. 4,671,882, Douglas et al., issued June, 1987, discloses a multi-step process for heavy metal stabilization. Douglas does not prefer to use limestone because he believes that the use of limestone results in the production of carbon dioxide gas when added to acid solution and such gas would adversely affect the pH increasing step essential to his multi-step heavy metal stabilization process. Both U.S. Pat. Nos. 4,889,640 and 5,037,479, Stanforth, suggest that limestone is not effective in the disclosed heavy metal stabilization processes because it is a non-reactive form of calcium and/or magnesium carbonate. The above-mentioned patents do not suggest any products or processes for acid gas removal.

SUMMARY OF THE INVENTION

It is the primary object of the present invention to provide a one-step method and single-product compositions that simultaneously stabilize heavy metals, remove acid gases and control pH in contaminated solid, semi-solid, liquid and/or gaseous complex matrices.

It is a further object of the present invention to provide a new method for the simultaneous treatment of a wide variety of matrices including in-process and waste materials contaminated with a broad range of heavy metals classified by the U.S. EPA as hazardous, such that geochemically stable, substantially non-leaching compounds of heavy metals are formed and the contaminated matrices are rendered inert.

It is another object of the present invention to provide a new family of compositions that achieve permanent stability of leachable heavy metals in complex matrices exposed to actual environmental conditions.

It is still another object of the present invention to provide a method and a general range of compositions that stabilize more heavy metals than those in the priorart using one-step treatment and using a single product which may contain one or more reactive agents.

It is yet another object of the present invention to provide a method and compositions that are more cost-effective than those of the prior art in stabilizing heavy metals in a wide variety of complex matrices.

In accordance with the present invention there is provided a method and compositions for the treatment of in-process hazardous materials and waste materials contaminated with hazardous heavy metals to levels of local, state and federal regulatory limits. Simultaneously, this invention provides a single-step method and single-product compositions for heavy metal stabilization, acid gas removal and pH control in contaminated complex matrices.

Specifically, the present invention encompasses a composition for the treatment of heavy metal-containing matrices comprising an effective amount of sulfonated calcium aluminum magnesium phosphate. The composition may optionally include magnesium sulfite and/or hydroboracite.

The invention also relates to a method for making a composition for the treatment of heavy metal-containing matrices comprising the steps of mixing the following materials:
  (a) a phosphate-containing material selected from the group consisting of phosphoric acid, rock phosphate, apatite, triple super phosphate, calcium magnesium monohydrogen phosphate dihydrate, alkali phosphate, and mixtures thereof;

(b) an aluminum-containing material selected from the group consisting of kaolinite, bauxite, alumina dihydrate, bentonite, zeolites, and mixtures thereof; and (c) an alkaline earth-containing material selected from the group consisting of dolomite, dolime, quicklime, fly ash, limestone, brucite, magnesite, periclase, dolomitic limestone, magnesia, magnesium hydroxide, hydroboracite, colemanite, and mixtures thereof; and sulfonating the product(s) of said mixing step.

DETAILED DESCRIPTION OF THE INVENTION

The goals set forth above are accomplished using a single product and a one-step application method, as opposed to using several different reagents and multi-step or sequential application method to:

(1) stabilize a broad spectrum of heavy metals (Table I) listed by the U.S. EPA as hazardous;

(2) control acid gases found in complex matrices, including industrial processes and waste; and (3) control pH of the contaminated and treated matrices. This invention relates to compositions and methods for accomplishing these goals, :as well as to method for preparing those compositions.

Table I—U.S. EPA List of Hazardous Heavy Metals

Antimony, Arsenic, Barium, Beryllium, Cadmium, Chromium, CobaLt, Copper, Lead, Mercury, Molybdenum, Nickel, Selenium, Silver, Thallium, Vanadium, and Zinc In developing the heavy metal stabilizing product compositions of this invention, economic considerations were applied to the following technical conceptual basis: Ingredients that form salts of low solubility with the heavy metals in question will also produce permanently stable, pH independent, complex, non-leaching compounds that immobilize the heavy metals when they contain glass (non-crystalline) network forming cations (such as Si, B, P, Ge and mixtures thereof) and glass (non-crystalline) network forming anions (such as O, S, Se, Te and mixtures thereof). In conjunction with ingredients containing the glass (non-crystalline) network forming ions, those containing network dwellers (such as Al, Mg, Ga and mixtures thereof) and network modifiers (such as Ca, Mg and mixtures thereof) are also found to help in stabilizing heavy metals contained in contaminated matrices. It is not necessary that glass actually be formed as a result of the reaction between heavy metals and the heavy metal stabilizer, but rather that the ingredients used to prepare the heavy metal stabilizers be capable of forming glass. It is important that salts of low solubility are formed as a result of the reaction between these ions and the heavy metals.

Thus, the technical concept of this invention advances two essential conditions for the production of permanently stable, pH independent, complex, non-leaching compounds that immobilize the heavy metals: (1) in selecting the ingredients for heavy metal stabilizing product compositions, it is important that they are capable of forming glass (that is, they contain glass network forming, network dwelling or network modifying ions), and (2) that salts of low solubility be formed as a result of the reaction between these ions and the heavy metals in question.

Sulfonated Calcium Aluminum Magnesium Phosphate (SCAMP) is a product composition that fits the technical concept by itself, as well as in conjunction with other ingredients. SCAMP can be described by the general formula $x \cdot (C_{12}H_{25}(C_6H_4)SO_3Na)$ $(Ca_3Al\ Mg_3(PO_4)_5 9H_2O)$, wherein x<1. It can also be described as a sulfonated phosphate or a sulfonated mixture of phosphates, with ingredients containing calcium, aluminum and magnesium ions. The sulfonate in this case is sodium dodecylbenzene sulfonate. The presence of SCAMP can be detected directly by the combination of powder x-ray diffraction technique for calcium aluminum magnesium phosphate and wet chemical analysis for the sulfonate. SCAMP prepared according to the present application is an effective stabilizer for a broad spectrum of heavy metals.

In water, the sulfonate behaves like soap in forming micelles, but has an advantage over soap in not forming precipitates with calcium ions. Additionally, the sulfonate being a surfactant, reduces the surface tension of the particles coated with it, accelerates reactions between acidic and basic ingredients in a given mixture to form complex salts, prevents caking, and improves flowability of the product. The sulfonate also promotes the formation of heavy metal complex salts of very low solubility by facilitating the sequestering and fixing of heavy metal leachates from a contaminated matrix. These practically insoluble complex salts confirm pH independent and permanent fixing of leachates in a landfill. Sulfonates useful in the present invention include any salt of the reaction product of sulfonic acid and hydrocarbons, such as long chain alkylbenzene sulfonates, with sodium dodecybenzene sulfonate being preferred.

SCAMP can be prepared in a number of ways. As an example, to produce one mole of SCAMP, combine 1½ moles of dolomitic limestone or 3 moles of dolomitic lime; with ½ mole of either kaolinite, bauxite or alumina trihydrate; react the same with 5 moles of phosphoric acid and treat the reaction product with less than one mole of the sulfonate. As another example, to produce one mole of SCAMP, combine and react 1½ moles of dolomitic limestone or 3 moles of dolomitic lime; with ½ mole of either kaolinite, bauxite or alumina trihydrate; and with 2½ moles of either triple super phosphate or rock phosphate, along with an appropriate amount of water, if needed, and less than one mole of the sulfonate. The solid raw materials are ground or pulverized to fine powder to provide high surface area for the required reaction(s) to take place. It is sometimes helpful to add heat to the reaction, although frequently the increased temperatures caused by grinding and the heat of reaction between ingredients are sufficient to provide the desired end product.

In general, a SCAMP-containing single product composition for the treatment of heavy metal-containing matrices may be prepared by combining, mixing and reacting the following materials:

(a) a phosphate-containing material selected from the group consisting of phosphoric acid, rock phosphate, apatite, triple super phosphate, calcium magnesium monohydrogen phosphate dihydrate, alkali phosphate, and mixtures thereof (preferably phosphoric acid, rock. phosphate or triple super phosphate, and most preferably rock phosphate);

(b) an aluminum-containing material selected from the group consisting of kaolinite, bauxite, alumina trihydrate, bentonite, zeolites, and mixtures thereof (preferably bauxite or kaolinite); and (c) an alkaline earth-containing material selected from the group consisting of dolomitic limestone (dolomite), dolomitic lime (dolime), quicklime, fly ash, limestone, brucite, magnesite, periclase, magnesia, magnesium hydroxide, hydroboracite, colemanite, and mixtures thereof (preferably dolomitic limestone, dolimitic lime or hydroboracite, and most preferably dolomitic limestone);

and sulfonating the product(s) of said combining, mixing and reacting steps.

The proportions of the individual reactions listed above may be varied depending on the properties required for the final product. For example, for optimal heavy metal stabilization, the amount of material(s) from group (a) above in proportion to groups (b) and (c) should be about 6:1:3. For optimal acid gas control, the ratio should be about 6:1:12. For optimal pH control of the contaminated and treated matrices, the ratio should be about 6:1:3. SCAMP is an essential active agent in the product composition of the invention that assures in a single step, simultaneous and effective stabilization of at least 8 of the 17 heavy metals listed in Table I (see Table II below), as well as acid gas and pH control. Materials from groups (a), (b) or (c) used in excess of that required stoichiometrically for the formation of SCAMP are essentially for fine tuning the heavy metal stabilization, acid gas control or pH control characteristics of the final product. For example, formulating a product such that it contains excess phosphate material provides extra benefits in terms of pH control and in the stabilization of heavy metals that form phosphates of low solubility. Excess aluminum-containing material helps in pH control and in the stabilization of heavy metals that form oxides or hydroxides of low solubility, while excess alkaline earth-containing material helps in pH control and acid gas control.

Stabilization of all 17 heavy metals listed as hazardous by the U.S. EPA can be accomplished in a single-step, along with acid gas and pH control, using a product composition that comprises SCAMP and sulfur-containing materials such as magnesium sulfite, calcium sulfite, magnesium sulfate, sodium metabisulfite, calcium magnesium sulfite, epsom salt, gypsum, and mixtures thereof. Preferred sulfur-containing materials include magnesium sulfate, calcium sulfate and calcium magnesium sulfite, and mixtures thereof, with magnesium sulfite being most preferred. An inexpensive source of magnesium sulfite that also contains minor amounts of magnesium sulfate is Scrubber Magnesium Product (SMP). This material is a by-product of scrubbing acid gases, like sulfur dioxide and oxides of nitrogen, with magnesium-containing reagents, such as magnesia, magnesium hydroxide, calcium magnesium oxide (dolime), calcium magnesium borate (hydroboracite), and calcium magnesium carbonate (dolomite). The use of sulfur-containing material (for example, SMP) alone, stabilizes 15 of the 17 heavy metals fairly well. Relative effectiveness of SMP alone and in combination with SCAMP is shown in Table II. The use of hydrated calcium magnesium borate, that is, hydroboracite (HB), alone or in conjunction with SCAMP, SMP and mixtures thereof is also depicted in Table II.

The compositions of the present invention comprise an amount of each specified component which is effective to stabilize the heavy metals present in ile materials being treated, as well as to control pH and acid gas. Specifically, compositions of the present invention contain from about 10% to about 100%, preferably from about 10% to about 50% SCAMP, from about 0% to about 90%, preferably from about 5% to about 50%, magnesium sulfite, and from about 0% to about 90%, preferably from about 10% to about 50% hydroboracite. A few examples of SCAMP-, SMP-, and HB-containing compositions found to be effective in achieving the goals of the present invention are as follows:

| | SCAMP ingredients reported in wt % | | | | | |
|---|---|---|---|---|---|---|
| Ex. # | Phosphate-containing materials | Aluminum-containing materials | Alkaline earth-containing materials | Sulfonate | SMP wt % | HB wt % |
| 1 | 10–15 | 0.1–10 | 30–40 | 0.1–10 | 40–60 | 0–10 |
| 2 | 15–25 | 0.1–30 | 50–60 | 0.1–10 | 0–30 | 0–30 |
| 3 | 30–50 | 0.1–25 | 10–30 | 0.1–10 | 30–50 | 0–25 |
| 4 | 5–15 | 0.1–10 | 30–50 | 0.1–10 | 30–50 | 0–35 |
| 5 | 5–15 | 0.1–10 | 50–70 | 0.1–10 | 0–40 | 0–25 |

When the compositions of the present invention are used for the stabilization of heavy metals, the end result is an inert, environmentally harmless product of the reaction between a heavy metal-containing matrix and the composition containing up to about 30% (by weight) glass network forming cations and up to about 35% network forming anions, up to about 65% glass network dwelling ions, and up to about 75% glass network modifying ions.

TABLE II

Relative Effectiveness in Stabilizing Heavy Metals

| Heavy Metal | SCAMP | SMP | HB | SCAMP + SMP | SCAMP + HB | SMP + HB | SCAMP + SMP + HB |
|---|---|---|---|---|---|---|---|
| Sb | Poor | Fair | Fair | Fair | Good | Good | Good |
| As | Poor | Fair | Poor | Fair | Fair | Fair | Fair |
| Ba | Fair | Fair | Poor | Good | Fair | Fair | Good |
| Be | Poor | Fair | Fair | Fair | Good | Good | Good |
| Cd | Fair | Fair | Fair | Good | Good | Good | Good |
| Cr | Fair | Fair | Fair | Good | Good | Good | Good |
| Co | Fair | Poor | Fair | Fair | Fair | Fair | Good |
| Cu | Poor | Fair | Fair | Fair | Good | Good | Good |
| Pb | Fair | Fair | Fair | Good | Good | Good | Good |
| Hg | Fair | Fair | Fair | Good | Good | Good | Good |
| Mo | Poor | Fair | Fair | Fair | Good | Good | Good |
| Ni | Fair | Poor | Fair | Fair | Fair | Fair | Good |
| Se | Poor | Fair | Poor | Fair | Fair | Fair | Fair |
| Ag | Fair | Fair | Poor | Good | Fair | Fair | Good |
| Tl | Poor | Fair | Fair | Fair | Good | Good | Good |
| V | Poor | Fair | Fair | Fair | Good | Good | Good |
| Zn | Fair | Fair | Fair | Good | Good | Good | Good |

The combination of SCAMP, SMP and HB outperforms the combination of SCAMP and SMP, as well as the combination of SMP and HB, and the combination of SCAMP and HB, although stabilization of all 17 hazardous heavy metals is accomplished by all four sets of product combinations. By way of example, a 3:2 ratio by weight of SCAMP to SMP has produced excellent results in controlling the leachability of heavy metals such as Pb, Cd, and Cr at 6 percent dosage of the product by weight of solids in ferrous foundry wastewater. By way of further example, a 1:1 ratio by weight of SMP to HB has produced good results, in controlling acid gases in an industrial process. By way of another example, a 6:3:1 ratio by weight of SCAMP to SMP to HB has produced good results in controlling acid gases and pH as well as in controlling the leachability of all 17 heavy metals of Table I. Depending on the total concentration and the number of the heavy metals, to be treated, dosages of no more than about 35 percent of the solids in a contaminated matrix have reduced the leaching of all 17 listed heavy metals to within permissible levels. In fact, dosages of less than about 10 percent by weight of the solids, even as low as about 3 percent, have been found to be effective in most cases. When SMP (or other magnesium sulfite-type composition) is used alone, it is used in an amount of from about 5% to about 50% by weight of the solids in tie contaminated matrix. When hydroboracite is used alone, it is used in an amount of from about 5% to about 50% of the solids in the contaminated matrix.

Matrices contaminated with heavy metals and acid gases as well as those matrices requiring pH control are treated with product compositions of this invention in a dry or a slurry form. A product of this invention is injected into the in-process dust stream or added and mixed thoroughly with in-process wastewater; or in the case of contaminated soil, it is admixed in a continuous or batch mixer. The resultant product is found to be environmentally harmless with the heavy metals stabilized, pH controlled and acid gases neutralized.

While the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. Sulfonated calcium aluminum magnesium phosphate having the formula $x \cdot (C_{12}H_{25}(C_6H_4)SO_3Na)$ $(Ca_3Al\ Mg_3(PO_4)_5 9H_2O)$, wherein $x<1$.

2. A composition comprising the sulfonated calcium aluminum magnesium phosphate of claim 1 and magnesium sulfite.

3. A composition comprising the sulfonated calcium aluminum magnesium phosphate according to claim 1 and hydroboracite.

4. A composition comprising the sulfonated calcium aluminum magnesium phosphate according to claim 1, magnesium sulfite, and hyrdroboracite.

5. A method of treating a heavy metal-containing matrix comprising contacting said matrix with an effective amount of the sulfonated calcium aluminum magnesium phosphate according to claim 1 to immobilize heavy metals.

6. A method of treating a heavy metal-containing matrix comprising contacting said matrix with an effective amount of the composition according to claim 2 to immobilize heavy metals.

7. A method of treating a heavy metal-containing matrix comprising contacting said matrix with an effective amount of the composition according to claim 3 to immobilize heavy metals.

8. A method of treating a heavy metal-containing matrix comprising contacting said matrix with an effective amount of the composition according to claim 4 to immobilize heavy metals.

9. A method for the control of acid gas comprising contacting an acid gas-containing matrix with an acid gas-controlling amount of the sulfonated calcium aluminum magnesium phosphate of claim 1.

10. A method for the control of acid gas comprising contacting an acid gas-containing matrix with an acid gas-controlling amount of the composition of claim 2.

11. A method for the control of acid gas comprising contacting an acid gas-containing matrix with an acid gas-controlling amount of the composition of claim 3.

12. A method for the control of acid gas comprising contacting an acid gas-containing matrix with an acid gas-controlling amount of the composition of claim 4.

13. A method for the control of pH comprising contacting a matrix with a pH-controlling amount of the sulfonated calcium aluminum magnesium phosphate of claim 1.

14. A method for the control of pH comprising contacting a matrix with a pH-controlling amount of the composition of claim 2.

15. A method for the control of pH comprising contacting a matrix with a pH-controlling amount of the composition of claim 3.

16. A method for the control of pH comprising contacting a matrix with a pH-controlling amount of the composition of claim 4.

* * * * *